US011006250B2

(12) United States Patent
Bastide et al.

(10) Patent No.: US 11,006,250 B2
(45) Date of Patent: *May 11, 2021

(54) ENSURING IMPORTANT MESSAGES ARE VIEWED BY INTENDED RECIPIENT BASED ON TIME-TO-LIVE PATTERN

(71) Applicant: International Business Machines Corporation, Armonk, NY (US)

(72) Inventors: Paul R. Bastide, Ashland, MA (US); Matthew E. Broomhall, Goffstown, NH (US); Thomas J. Evans, IV, Cary, NC (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,972

(22) Filed: May 8, 2019

(65) Prior Publication Data

US 2019/0268733 A1 Aug. 29, 2019

Related U.S. Application Data

(63) Continuation of application No. 15/804,800, filed on Nov. 6, 2017, now Pat. No. 10,375,537, which is a
(Continued)

(51) Int. Cl.
*G06F 15/16* (2006.01)
*H04W 4/14* (2009.01)
(Continued)

(52) U.S. Cl.
CPC ........... *H04W 4/14* (2013.01); *H04L 41/0893* (2013.01); *H04L 43/067* (2013.01); *H04L 43/16* (2013.01); *H04L 51/26* (2013.01); *H04W 4/21* (2018.02)

(58) Field of Classification Search
CPC ................................ H04W 4/14; H04L 43/16
See application file for complete search history.

(56) References Cited

U.S. PATENT DOCUMENTS 9,117,227 B1 * 8/2015 Agrawal ............ G06Q 30/0242
2014/0279684 A1 9/2014 Liao et al.
(Continued)

FOREIGN PATENT DOCUMENTS

| EP | 1107148 A3 | 6/2001 |
| WO | 2012027749 A1 | 3/2012 |
| WO | 2012066650 A1 | 5/2012 |

OTHER PUBLICATIONS

List of IBM Patents or Patent Applications Treated as Related, May 10, 2019, pp. 1-2.
(Continued)

*Primary Examiner* — Hua Fan
(74) *Attorney, Agent, or Firm* — Robert A. Voigt, Jr.; Winstead PC

(57) ABSTRACT

A method, system and computer program product for ensuring that important messages are viewed by the intended recipient. A time-to-live pattern for a message identified as being important is determined for the target group, where the time-to-live pattern indicates a set of presentation criteria (e.g., impression analysis, such as the number of views of the message). The target group refers to the intended recipient(s) of the message identified as being important. The message is then monitored in the network environment with respect to the time-to-live pattern using the set of presentation criteria of the time-to-live pattern. An action (e.g., pinning the message for a period of time) may then be performed to increase the priority of the message for the target group if the time-to-live pattern has underachieved within a threshold period of time (i.e., has not met the requirements of the presentation criteria within the threshold period of time).

10 Claims, 4 Drawing Sheets

Related U.S. Application Data continuation of application No. 15/237,931, filed on Aug. 16, 2016, now Pat. No. 10,171,320.

(51) Int. Cl.
*H04L 12/58* (2006.01)
*H04W 4/21* (2018.01)
*H04L 12/24* (2006.01)
*H04L 12/26* (2006.01)

(56) References Cited

U.S. PATENT DOCUMENTS

2015/0095021 A1 4/2015 Spivack et al.
2015/0370797 A1 12/2015 Mishra et al.

OTHER PUBLICATIONS

"LinksWithin," https://www.trustsphere.com/how-it-works/linkswithin, 2016, pp. 1-6.
Sanebox.com, "SaneBox for Business," https://www.sanebox.com/business, 2016, pp. 1-4.
Sharp et al., "Important Messages in the 'Post': Recent Discoveries in 5-HT Neurone Feedback Control," TRENDS in Pharmacological Sciences, vol. 28, No. 12, 2007, pp. 629-636.
Office Action for U.S. Appl. No. 16/167,273 dated Sep. 26, 2019, pp. 1-26.
Office Action for U.S. Appl. No. 16/167,273 dated Mar. 13, 2020, pp. 1-16.
Office Action for U.S. Appl. No. 16/167,273 dated Jul. 24, 2020, pp. 1-5.

\* cited by examiner

ENSURING IMPORTANT MESSAGES ARE VIEWED BY INTENDED RECIPIENT BASED ON TIME-TO-LIVE PATTERN

TECHNICAL FIELD

The present invention relates generally to communications, and more particularly to ensuring that important messages are viewed by the intended recipient based on a time-to-live pattern established for the important message.

BACKGROUND

There are many different ways to share and process information among users, such as via e-mail and social media posts. For example, the user may post a message on the user's social network profile space, such as a wall, or on an activity stream (e.g., news feed, timeline). Such a mechanism allows users to rapidly share information with others as well as rapidly gather information from others. However, users may often be overwhelmed by the volume of messages received in such mechanisms.

As a result of the large volume of messages being received, recipients to these messages may miss viewing important messages. For example, a user may post a message on a social networking activity stream about compliance (e.g., "Compliance is important, everyone should take the compliance training http://training/compliance"). However, a recipient of the message, who is a member of the same online social network (e.g., Twitter®) as the user, never sees the message as too many messages are being generated on the recipient's activity stream.

Unfortunately, there is not currently a means for ensuring that important messages are viewed by the intended recipient.

SUMMARY

In one embodiment of the present invention, a method for ensuring that important messages are viewed by the intended recipient comprises identifying a message as being important for a target group based on identifying keywords, based on detecting a flagged attribute or based on receiving a rating of importance from a user. The method further comprises determining a time-to-live pattern for the message for the target group, where the time-to-live pattern indicates a set of presentation criteria for utilization of the message in a network environment. The method additionally comprises monitoring, in the network environment, the message with respect to the time-to-live pattern using the set of presentation criteria. Furthermore, the method comprises performing an action to increase priority of the message for the target group in response to detecting an underachievement of the time-to-live pattern within a threshold period of time, where the underachievement comprises not meeting requirements of the set of presentation criteria.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
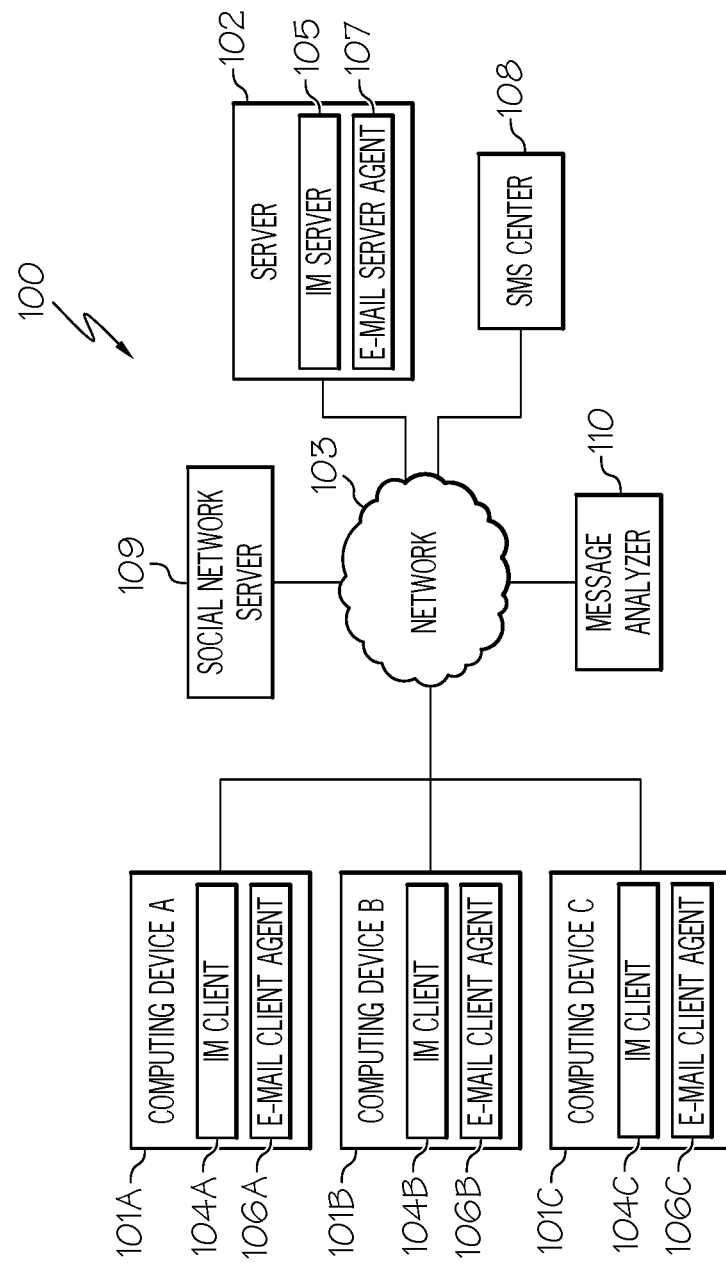
FIG. 1 illustrates an embodiment of the present invention of a communication system configured in accordance with an embodiment of the present invention.

The present invention comprises a method, system and computer program product for ensuring that important messages are viewed by the intended recipient. In one embodiment of the present invention, a message (e.g., e-mail message, instant message, text message, social media post) is identified as being important, such as by using natural language processing, detecting a flagged attribute or receiving an importance rating from the user. A time-to-live pattern for the message is determined for a target group, where the time-to-live pattern indicates a set of presentation criteria for utilization of the message in a network environment. The "time-to-live pattern," as used herein, includes a set of presentation criteria, such as the relationship details (e.g., relationship between the author/sender and the recipient, the hierarchical relationship or the frequency of connection between the author/sender and the recipient), the behaviors of the message (e.g., message is commented, replied, forwarded, reshared, liked, recommended, etc.), impression analysis (e.g., the amount of time spent on viewing the message, such as 2 seconds, the number of views of the message) and frequency of action (e.g., how often, such as every 30 minutes, to perform an action to increase the priority of the message for the target group if needed). The "target group," as used herein, refers to the intended recipient(s) of the message identified as being important. The target group may include a social network (the entire social network or a personal social network), a person, co-workers (e.g., managers, employees) or followers of a tag, a hashtag or a mention. The message is then monitored in the network environment with respect to the time-to-live pattern using the set of presentation criteria (e.g., number of views) of the time-to-live pattern. An action may then be performed to increase the priority of the message for the target group if the time-to-live pattern has underachieved within a threshold period of time. "Underachieved," as used herein, refers to not meeting the requirements of the presentation criteria. For example, if the time-to-live pattern for a message consisted of two views within a threshold period of time (ten minutes) and only one view has occurred, then the time-to-live pattern is said to have "underachieved." Actions that may be performed include performing a synthetic social action, such as requesting the author to like the message after posting the message on a social network. In another example, the action may include pinning the message for a period of time to increase the priority of the message. In a further example, the action may include mentioning the message to drive additional conversation. By performing an action to increase the priority of the important message for the target group, the important message is more likely to be viewed by the intended recipient(s). Important messages may now be less likely to be missed by the intended recipient(s) by ensuring that important messages meet the presentation criteria of the time-to-live pattern for the important message.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and server 102. A description of the hardware configuration of computing device 101 is provided below in connection with FIG. 2.

Computing devices 101 may be configured to send and receive text-based messages in real-time during an instant messaging session. Any user of computing device 101 may be the creator or initiator of an instant message (message in instant messaging) and any user of computing device 101 may be a recipient of an instant message. Furthermore, any user of computing device 101 may be able to create, receive and send e-mails. Additionally, any user of computing device 101 may be able to send and receive text messages, such as Short Message Services (SMS) messages. In addition, any user of computing device 101 (e.g., mobile phone) may be capable of initiating or receiving a telephone call over network 103 (e.g., circuit-switched telephone network, Wi-Fi network, an IEEE 802.11 standards network).

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101A-101C may include a software agent, referred to herein as the Instant Messaging (IM) client 104A-104C, respectively. Instant messaging clients 104A-104C may collectively or individually be referred to as instant messaging clients 104 or instant messaging client 104, respectively. Furthermore, server 102 may include a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for computing device 101 to connect to the IM server 105 which provides the functionality of distributing the instant messages to the IM clients 104 associated with each of the sharing users.

Computing device 101A-101C may further include a software agent, referred to herein as the e-mail client agent 106A-106C, respectively. E-mail client agents 106A-106C may collectively or individually be referred to as e-mail client agents 106 or e-mail client agent 106, respectively. Furthermore, server 102 may include a software agent, referred to herein as the e-mail server agent 107. E-mail client agent 106 enables the user of computing device 101 to create, send and receive e-mails. E-mail server agent 107 is configured to receive e-mail messages from computing device 101 and distribute the received e-mail messages among the one or more computing devices 101.

While the preceding discusses each computing device 101 as including an IM client 104 and an e-mail client agent 106, each computing device 101 may not necessarily include each of these software agents. Furthermore, while the preceding discusses a single server 102 including the software agents, such as IM server 105 and e-mail server agent 107, multiple servers may be used to implement these services. Furthermore, each server 102 may not necessarily be configured to include all of these software agents, but only a subset of these software agents.

System 100 further includes a Short Message Service (SMC) center 108 configured to relay, store and forward text messages, such as SMS messages, among computing devices 101 through network 103.

System 100 further includes a social network server 109, which may be a web server configured to offer a social networking and/or microblogging service, enabling users of computing devices 101 to send and read other users' posts. "Posts," as used herein, include any one or more of the following: text (e.g., comments, sub-comments and replies), audio, video images, etc. Social network server 109 is connected to network 103 by wire or wirelessly. While FIG. 1 illustrates a single social network server 109, it is noted for clarity that multiple servers may be used to implement the social networking and/or microblogging service.

System 100 further includes a unit, referred to herein as the "message analyzer 110," connected to network 103 via wire or wirelessly. Message analyzer 110 is configured to ensure that important messages are viewed by the intended recipient(s) based on what is referred to herein as the "time-to-live pattern." The "time-to-live pattern," as used herein, includes a set of presentation criteria, such as the relationship details (e.g., relationship between the author/sender and the recipient, the hierarchical relationship or the frequency of connection between the author/sender and the recipient), the behaviors of the message (e.g., message is commented, replied, forwarded, reshared, liked, recommended, etc.), impression analysis (e.g., the amount of time spent on viewing the message, such as 2 seconds, the number of views of the message) and frequency of action (e.g., how often, such as every 30 minutes, to perform an action to increase the priority of the message for the target group if needed). If the presentation criteria of the time-to-live pattern is underachieving within a threshold amount of time, then message analyzer 110 is configured to perform an action, such as performing a synthetic social action (e.g., instructing the author to like the message after creating the message), pinning the message for a period of time or mentioning the message (e.g., mentioning the message to drive additional conversation, adding comments to the initial social post), in order to further promote the important message so as to ensure that the message is viewed by the intended recipient as discussed in greater detail further below. A description of the hardware configuration of message analyzer 110 is provided below in connection with FIG. 3.

System 100 is not to be limited in scope to any one particular network architecture. System 100 may include any number of computing devices 101, servers 102, networks 103, SMS centers 108, social network servers 109 and message analyzers 110.

Figure 2:
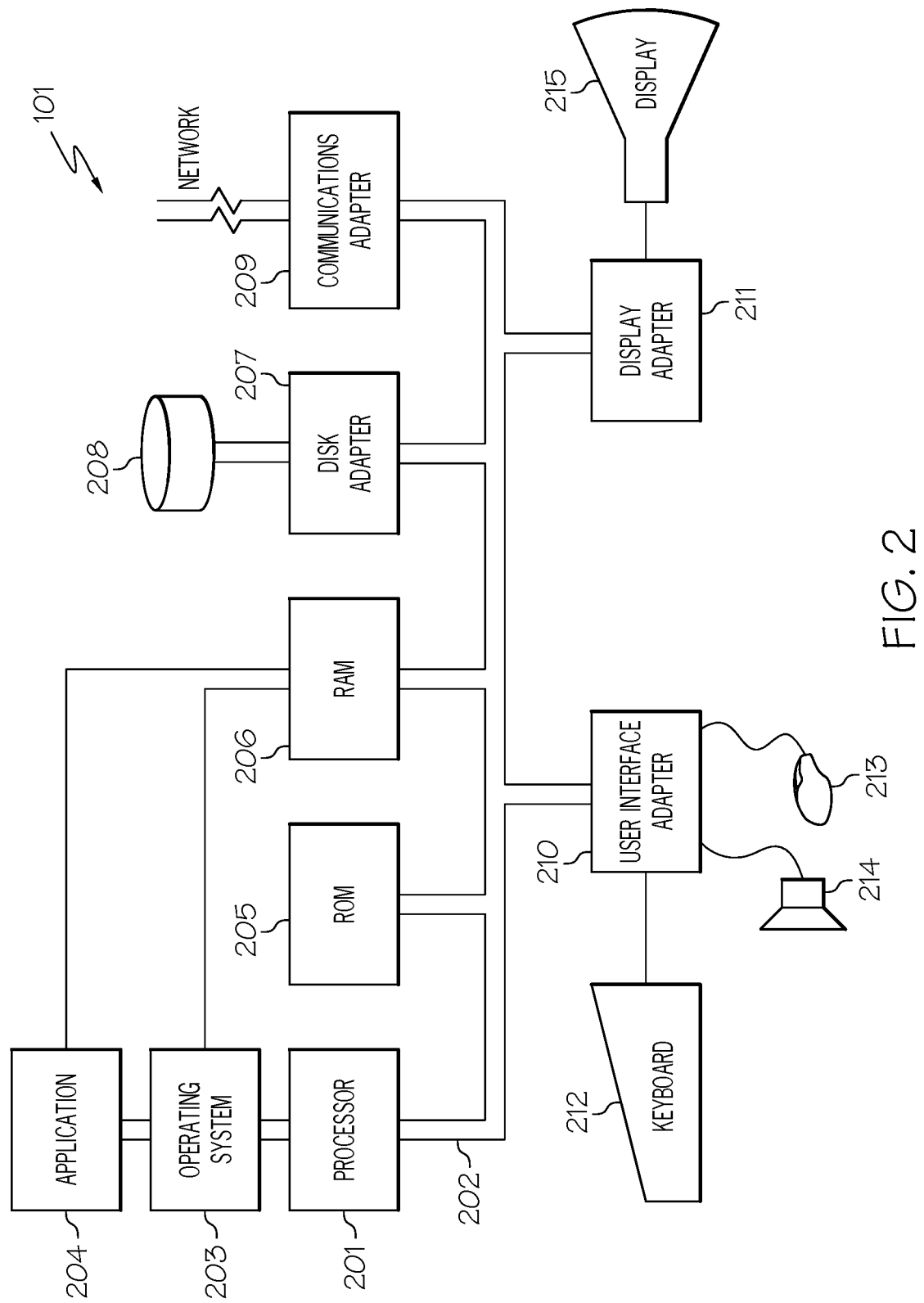
FIG. 2 illustrates an embodiment of the present invention of a hardware configuration of a computing device which is representative of a hardware environment for practicing the present invention.

Referring now to FIG. 2, FIG. 2 illustrates an embodiment of the present invention of a hardware configuration of computing device 101 (FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a web browser that allows a user to indicate to message analyzer 110 (FIG. 1) a set of presentation criteria for the time-to-live pattern.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive.

Computing device 101 may further include a communications adapter 209 coupled to bus 202. Communications adapter 209 interconnects bus 202 with an outside network (e.g., network 103 of FIG. 1) thereby enabling computing device 101 to communicate with other devices (e.g., message analyzer 110).

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214. Other input mechanisms may be used to input data to computing device 101 that are not shown in FIG. 2, such as display 215 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

Figure 3:
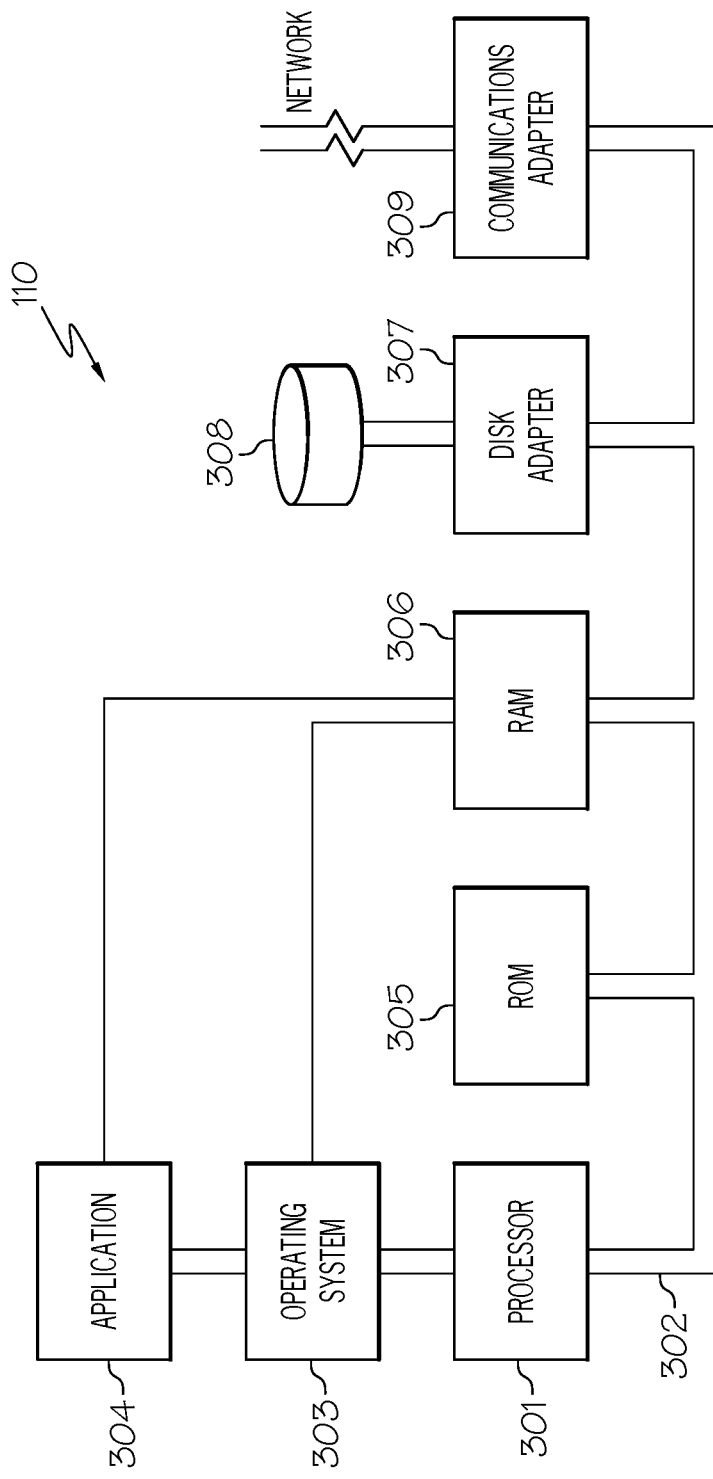
FIG. 3 illustrates an embodiment of the present invention of a hardware configuration of a message analyzer configured in accordance with an embodiment of the present invention.

Referring now to FIG. 3, FIG. 3 illustrates an embodiment of the present invention of a hardware configuration of message analyzer 110 (FIG. 1) which is representative of a hardware environment for practicing the present invention. Referring to FIG. 3, message analyzer 110 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for ensuring that important messages are viewed by the intended recipient(s) as discussed further below in connection with FIG. 4.

Referring again to FIG. 3, read-only memory ("ROM") 305 is coupled to system bus 302 and includes a basic input/output system ("BIOS") that controls certain basic functions of message analyzer 110. Random access memory ("RAM") 306 and disk adapter 307 are also coupled to system bus 302. It should be noted that software components including operating system 303 and application 304 may be loaded into RAM 306, which may be message analyzer's 110 main memory for execution. Disk adapter 307 may be an integrated drive electronics ("IDE") adapter that communicates with a disk unit 308, e.g., disk drive. It is noted that the program for ensuring that important messages are viewed by the intended recipient(s), as discussed further below in connection with FIG. 4, may reside in disk unit 308 or in application 304.

Communications analyzer 110 may further include a communications adapter 309 coupled to bus 302. Communications adapter 309 interconnects bus 302 with an outside network (e.g., network 103 of FIG. 1) thereby allowing communications analyzer 110 to communicate with other devices, such as computing devices 101, servers 102, SMS centers 108 and social network servers 109.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there are many different ways to share and process information among users, such as via e-mail and social media posts. For example, the user may post a message on the user's social network profile space, such as a wall, or on an activity stream (e.g., news feed, timeline). Such a mechanism allows users to rapidly share information with others as well as rapidly gather information from others. However, users may often be overwhelmed by the volume of messages received in such mechanisms. As a result of the large volume of messages being received, recipients to these messages may miss viewing important messages. For example, a user may post a message on a social networking activity stream about compliance (e.g., "Compliance is important, everyone should take the compliance training http://training/compliance"). However, a recipient of the message, who is a member of the same online social network (e.g., Twitter®) as the user, never sees the message as too many messages are being generated on the recipient's activity stream. Unfortunately, there is not currently a means for ensuring that important messages are viewed by the intended recipient.

The principles of the present invention provide a means for ensuring that important messages are viewed by the intended recipient(s) as discussed below in connection with FIG. 4.

Figure 4:
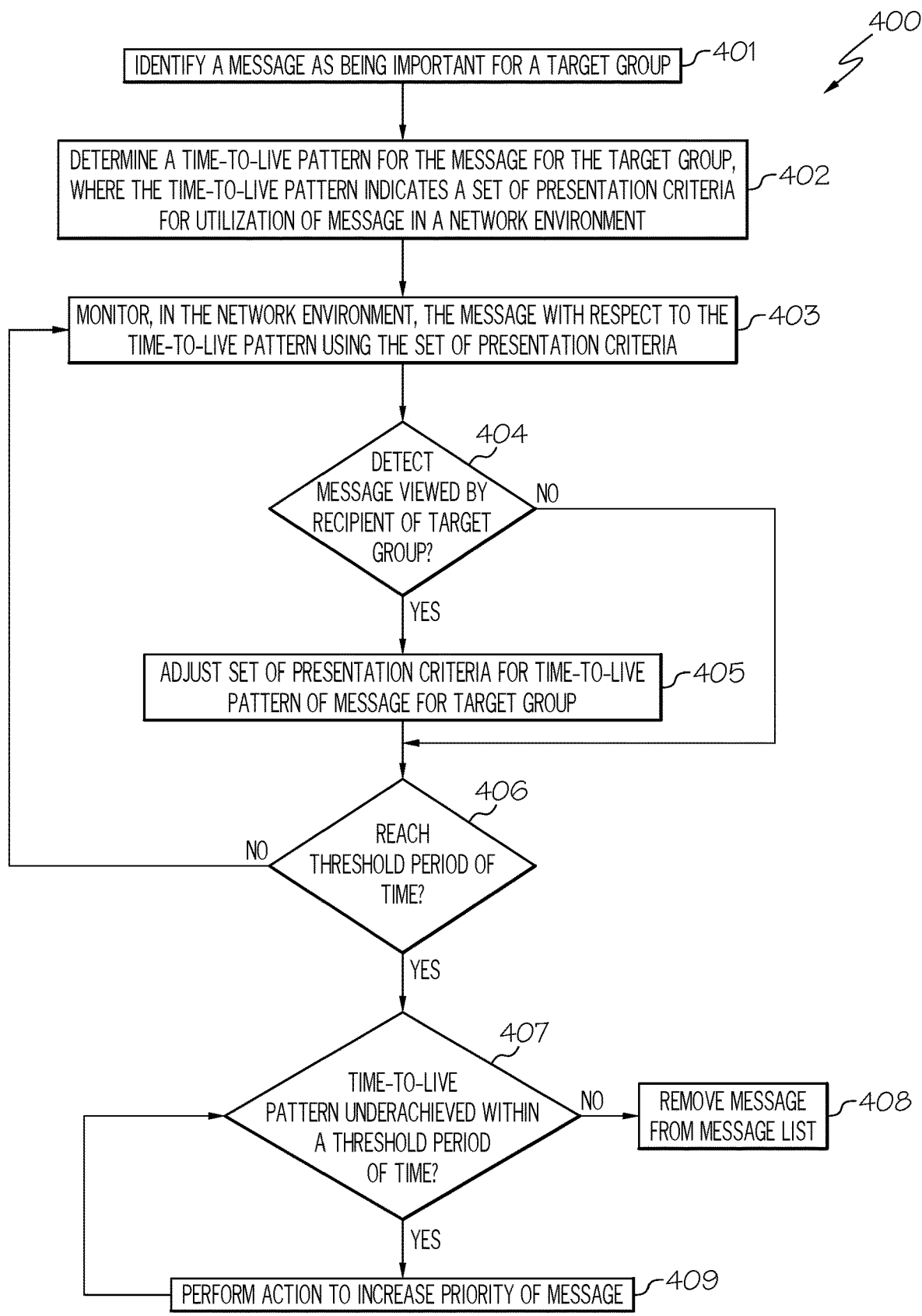
FIG. 4 is a flowchart of a method for ensuring that important messages are viewed by the intended recipient(s) in accordance with an embodiment of the present invention.

FIG. 4 is a flowchart of a method 400 for ensuring that important messages are viewed by the intended recipient(s) in accordance with an embodiment of the present invention.

Referring to FIG. 4, in conjunction with FIGS. 1-3, in step 401, message analyzer 110 identifies a message (e.g., e-mail message, instant message, text message, social media post) as being important for a target group (e.g., a social network, a person, co-workers, followers of a tag, a hashtag or a mention). A message may be identified as being important by message analyzer 110 using natural language processing. For example, message analyzer 110 may identify keywords (e.g., "important," "serious," "immediate attention"), such as in the body of the text of the message or in the subject line of the message, that would indicate a message of importance. For instance, in the social media post of "Compliance is important, everyone should take the compliance training http://training/compliance," the term of "important" in the post may indicate that the message has high importance and that message analyzer 110 should ensure that the intended recipient(s) should view such a message.

Message analyzer 110 may also identify a message as being important based on detecting a flagged attribute, such as the attribute of importance of the message being set to the logical value of one.

Furthermore, message analyzer 110 may identify a message as being important based on receiving a rating of importance from user 101 via the user interface of computing device 101. For example, user 101 may select the level of importance of an e-mail message as being important, such as via a slider.

In one embodiment, message analyzer 110 analyzes the message for importance while it is created or reviewed by the author/sender or after it has been published or sent. The term "message," as used herein, may include an electronic mail message, an instant message, a text message, a social media post or any other electronic form of communication.

The "target group," as used herein, refers to the intended recipient(s) of the message identified as being important in step 401. In one embodiment, the target group is designated by user 101, such as by the recipient(s) indicated by the user 101 to receive the message. In another embodiment, the target group may be deduced by message analyzer 110 based on the context in which the message is sent. For example, if the message is posted on the user's social network profile, then it may be deduced that the message is to be received by the user's friends in the user's social network, where a listing of the user's friends (and their contact information) can be obtained from the user's profile.

In one embodiment, the target group may include a social network (the entire social network or a personal social network), a person, co-workers (e.g., managers, employees) or followers of a tag, a hashtag or a mention.

In step 402, message analyzer 110 determines a time-to-live pattern for the message for the target group, where the time-to-live pattern indicates a set of presentation criteria for utilization of the message in a network environment, such as the network environment shown in FIG. 1. As discussed above, the "time-to-live pattern," as used herein, includes a set of presentation criteria, such as the relationship details (e.g., relationship between the author/sender and the recipient, the hierarchical relationship or the frequency of connection between the author/sender and the recipient), the behaviors of the message (e.g., message is commented, replied, forwarded, reshared, liked, recommended, etc.), impression analysis (e.g., the amount of time spent on viewing the message, such as 2 seconds, the number of views of the message) and frequency of action (e.g., how often, such as every 30 minutes, to perform an action to increase the priority of the message for the target group if needed).

In one embodiment, the presentation criteria is based, at least in part, on the number of recipients of the target group. For example, the greater the number of recipients of the target group, the larger the number of impressions, such as the number of views, that may be required in the time-to-live pattern.

In one embodiment, all or a portion of the presentation criteria to be used in the time-to-live pattern is determined by message analyzer 110, such as by using natural language processing (e.g., analyzing messages to determine relationship details). In one embodiment, all or a portion of the presentation criteria to be used in the time-to-live pattern is provided to message analyzer 110 by user 101, such as via a user interface of computing device 101.

Examples of the presentation criteria of the time-to-live pattern are discussed below.

For instance, the presentation criteria of the time-to-live pattern may utilize impression analysis. For example, in the scenario where an important message is being sent to a brother, the time-to-live pattern of the message may include 2 views (impression analysis) to ensure that the brother has viewed the message.

In another example, the presentation criteria of the time-to-live pattern may include relationship details, such as familial relationships. For example, message analyzer 110 may deduce the reasons as to why the message is important using natural language processing, such as focusing on keywords or phrases, such as "son injured." As a result, such a message may be important for relatives, such as the user's spouse and children, to view since it involves an injury to a family member. Consequently, message analyzer 110 may designate familial relationships in the time-to-live pattern, where the relatives can be determined based on the user's profile in a social media context (e.g., family list).

In a further example, the presentation criteria of the time-to-live pattern may include behaviors of the message, such as the commenting, replaying, forwarding, resharing and recommending of the message. For instance, the presentation criteria of the time-to-live pattern may designate a particular number of recommendations of the message, such as based on user input or the interpretation of the message by message analyzer 110. As an example, message analyzer 110 may utilize natural language processing to determine that the message needs to be forwarded to relatives based on the text of the message. For instance, the message may discuss an upcoming wedding that needs to be shared with relatives. As an example, the text of the message may state "The wedding will be occurring on Dec. 2, 2016. Please let our relatives know about this date." As a result of identifying keywords/phrases, such as "wedding," "relatives," and "know about this date," using natural language processing, message analyzer 110 may determine that the message needs to be forwarded to the relatives of user 101, where the relatives can be determined based on the user's profile in a social media context (e.g., family list, friends indicated as being relatives).

In step 403, message analyzer 110 monitors, in the network environment, such as shown in FIG. 1, the message with respect to the time-to-live pattern using the set of presentation criteria of the time-to-live pattern. For example, if the set of presentation criteria of the time-to-live pattern includes a number of views, then message analyzer 110 monitors the message with respect to those parameters (e.g., determine number of views).

In step 404, a determination is made by message analyzer 110 as to whether it detects the message being viewed by a recipient of the target group.

If message analyzer 110 detects the message being viewed by a recipient of the target group, then, in step 405, message analyzer 110 adjusts the set of presentation criteria for the time-to-live pattern of the message for the target group in response to the recipient of the target group viewing the message. For example, if the time-to-live pattern of the message includes two views and a recipient of the target group viewed the message, then the number of views is decremented by one so that time-to-live pattern of the message indicates one view. In this manner, the time-to-live pattern may indicate the number of views left to be accomplished prior to reaching the threshold period of time discussed below.

Upon adjusting the set of presentation criteria for the time-to-live pattern of the message for the target group or if message analyzer 110 does not detect the message being viewed by a recipient of the target group, then message analyzer 101 determines whether the threshold period of time has been reached in step 406.

The "threshold period of time," as used herein, refers to the amount of time to accomplish the requirements of the presentation criteria of the time-to-live pattern. In one embodiment, the threshold period of time is determined by message analyzer 110 based on the level of importance established by message analyzer 110. For example, message analyzer 110 may establish that the message is extremely important based on the usage of the terms "important" and "serious" using natural language processing. The higher the level of importance, the longer the duration of time the time-to-live pattern exists for accomplishing the presentation criteria.

In another embodiment, the threshold period of time is user-selected.

If the threshold period of time has not been reached, then message analyzer 110 continues to monitor, in the network environment, the message with respect to the time-to-live pattern using the set of presentation criteria of the time-to-live pattern in step 403.

If, however, the threshold period of time has been reached, then, in step 407, message analyzer 110 determines as to whether the time-to-live pattern has underachieved within a threshold period of time.

For example, if the time-to-live pattern for a message consisted of two views within the threshold period of time (ten minutes) and only one view has occurred, then the time-to-live pattern is said to have "underachieved." "Underachieved," as used herein, refers to not meeting the requirements of the presentation criteria.

In another example, if the time-to-live pattern for a message consisted of the amount of time that is to be spent on viewing the message (10 seconds) and only 6 seconds have been spent on viewing the message by the target group, then the time-to-live pattern is said to have "underachieved."

It is noted that the time-to-live pattern may consist of various criteria that may each need to be met within the threshold period of time. In another embodiment, the time-to-live pattern may include various presentation criteria (e.g., time spent viewing message, number of views) that allows the time-to-live pattern to achieve its goal based on satisfying any of the presentation criteria. For example, the presentation criteria may include the criteria of spending 10 seconds on viewing the message and three views. If either of these presentation criteria has been accomplished within the threshold period of time, then the time-to-live pattern may be said to have accomplished its goal.

If the time-to-live pattern has not underachieved (i.e., has achieved its goal) within the threshold period of time, then, in step 408, message analyzer 110 removes the message from the message list of those recipient(s) of the target group.

If, however, the time-to-live pattern has underachieved within the threshold period of time, then, in step 409, message analyzer 110 performs an action to increase the priority of the message for the target group. For example, message analyzer 110 may perform a synthetic social action, such as requesting user 101 (author) to like the message after posting the message on a social network. Alternatively, message analyzer 110 may itself like the message after the message has been posted on the social network. In another example, message analyzer 110 may pin the message for a period of time to increase the priority of the message. In a further example, message analyzer 110 may mention the message to drive additional conversation, such as "@Alice what do you think?"

By performing an action to increase the priority of the important message for the target group, the important message is more likely to be viewed by the intended recipient(s). Important messages may now be less likely to be missed by the intended recipient(s) by ensuring that important messages meet the presentation criteria of the time-to-live pattern for the important message. Improving the likelihood that important messages will be viewed in such a manner is a non-conventional way. By using computing technology to ensure that important messages meet the presentation criteria of the time-to-live pattern, important messages will be less likely to be missed by the intended recipient(s).

After performing an action to increase the priority of the message for the target group, a determination is made by message analyzer 110 as to whether the time-to-live pattern has underachieved within a threshold period of time in step 407. In one embodiment, such a determination is made after a period of time has elapsed, such as the frequency of action indicated in the time-to-live pattern.

In one embodiment, the time-to-live pattern may utilize a learning model to optimize the presentation of the messages based on how successful different actions were in causing messages to meet the presentation criteria of the time-to-live pattern. As a result, as time progresses, message analyzer 110 will perform more appropriate actions to cause the important message to meet particular presentation criteria of the time-to-live pattern.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for ensuring that important messages are viewed by the intended recipient, the method comprising:
identifying a message as being important for a target group based on identifying keywords, based on detecting a flagged attribute or based on receiving a rating of importance from a user;
determining a time-to-live pattern for said message for said target group, wherein said time-to-live pattern indicates a set of presentation criteria for utilization of said message in a network environment;
monitoring, in said network environment, said message with respect to said time-to-live pattern using said set of presentation criteria;

detecting said message being viewed by a recipient of said target group;

adjusting said set of presentation criteria for said time-to-live pattern for said message for said target group in response to said recipient of said target group viewing said message;

determining if said adjusted time-to-live pattern has underachieved within a threshold period of time, wherein said threshold period of time is an amount of time to accomplish requirements of said set of presentation criteria; and performing an action to increase priority of said message for said target group in response to detecting an underachievement of said time-to-live pattern within said threshold period of time, wherein said underachievement comprises not meeting said requirements of said set of presentation criteria.

2. The method as recited in claim 1, wherein said message is identified as being important while said message is being created or reviewed by an author of said message.

3. The method as recited in claim 1, wherein said target group corresponds to one or more intended recipients of said message identified as being important, wherein said target group is deduced based on context in which said message is sent.

4. The method as recited in claim 1, wherein said set of presentation criteria comprises relationship details, behaviors of said message and impression analysis, wherein said set of presentation criteria is based on a number of recipients of said target group.

5. The method as recited in claim 4, wherein said relationship details comprise one or more of the following: a relationship between an author of said message and a recipient, a hierarchical relationship and a frequency of connection between an author of said message and a recipient, wherein said behaviors of said message comprise one or more of the following: said message is commented, replied, forwarded, reshared, liked and recommended, wherein said impression analysis comprises one or more of the following: an amount of time spent viewing said message, and a number of views of said message.

6. The method as recited in claim 1, wherein said rating of importance is received from said user via a slider.

7. The method as recited in claim 1, wherein said adjusted time-to-live pattern has not underachieved within said threshold period of time in response to accomplishing each presentation criteria of said set of presentation criteria.

8. The method as recited in claim 1, wherein said adjusted time-to-live pattern has not underachieved within said threshold period of time in response to accomplishing one or more presentation criteria of said set of presentation criteria.

9. The method as recited in claim 1, wherein said priority of said message is increased by performing said action selected from the group consisting of: performing a synthetic social action, pinning said message and mentioning said message.

10. The method as recited in claim 1, wherein said target group is selected from the group consisting of: a social network, a person, co-workers and followers of a tag, a hashtag or a mention.

* * * * *